United States Patent [19]

Fukushima et al.

[11] Patent Number: 5,467,196
[45] Date of Patent: Nov. 14, 1995

[54] IMAGE FORMING APPARATUS WHICH FORMS HALFTONE IMAGES MIXED WITH CHARACTERS AND FINE LINES

[75] Inventors: Satoru Fukushima, Tokyo; Sono Gu, Omiya; Yoshito Mizoguchi, Yokohama, all of Japan

[73] Assignee: Canon Kabushiki Kaisha, Tokyo, Japan

[21] Appl. No.: 407,398

[22] Filed: Mar. 17, 1995

Related U.S. Application Data

[63] Continuation of Ser. No. 808,633, Dec. 17, 1991, abandoned.

[30] Foreign Application Priority Data

Dec. 19, 1990 [JP] Japan ................... 2-403856

[51] Int. Cl.$^6$ ................ H04N 1/40; G06K 9/46
[52] U.S. Cl. .............. 358/298; 358/458; 358/462; 382/169
[58] Field of Search .................. 358/296, 298, 358/300, 456, 458, 462; 355/208; 382/17, 18

[56] References Cited

U.S. PATENT DOCUMENTS

| | | | |
|---|---|---|---|
| 4,352,553 | 10/1982 | Hirahara | 355/208 |
| 4,667,228 | 5/1987 | Kawamura et al. | 358/80 |
| 4,800,442 | 1/1989 | Riseman et al. | 358/280 |
| 4,837,450 | 6/1989 | Satomura et al. | 250/571 |
| 4,887,167 | 12/1989 | Miura | 358/296 |
| 4,903,145 | 2/1990 | Funada | 358/462 |
| 4,907,286 | 3/1990 | Yamada | 382/51 |
| 4,931,864 | 6/1990 | Kawamura et al. | 358/80 |
| 4,958,219 | 9/1990 | Kadowaki | 358/75 |
| 4,969,053 | 11/1990 | Outa et al. | 358/458 |
| 5,016,118 | 5/1991 | Nannichi | 358/462 |
| 5,031,034 | 7/1991 | Shimizu et al. | 358/79 |
| 5,053,888 | 10/1991 | Namura | 358/458 |
| 5,075,788 | 12/1991 | Funada | 358/458 |
| 5,086,486 | 2/1992 | Yamada | 382/53 |
| 5,091,967 | 2/1992 | Ohsawa | 358/458 X |
| 5,117,293 | 5/1992 | Asada et al. | 358/298 |
| 5,119,207 | 6/1992 | Niitsuma et al. | 358/296 |
| 5,125,045 | 6/1992 | Murakami et al. | 358/456 X |
| 5,133,022 | 7/1992 | Weideman | 382/18 |
| 5,153,925 | 10/1992 | Tanioka et al. | 358/462 X |
| 5,172,132 | 12/1992 | Haneda et al. | 358/296 X |
| 5,173,783 | 12/1992 | Oku et al. | 358/456 |
| 5,212,741 | 5/1993 | Barski et al. | 382/18 X |

*Primary Examiner*—Peter S. Wong
*Assistant Examiner*—Eric Frahm
*Attorney, Agent, or Firm*—Fitzpatrick, Cella, Harper & Scinto

[57] ABSTRACT

When forming an image in which a half-tone image area such as photograph, screen, or the like and characters and fine lines exist the half-tone image area and the character and fine line portion are stably reproduced without deteriorating the picture qualities of both of them and, particularly, the character and fine line portion can be clearly reproduced. A digital image signal generated from an image reader is stored into an image memory on a pixel unit basis. A CPU subsequently reads the stored digital image signal and forms a frequency distribution function (density histogram) as a detection frequency of corresponding density values every pixel. The density level value of the portion in which the detection frequency is locally high is detected from the formed density histogram. The density level values are converted into at least one density value by a gradation correction circuit. An image having an excellent gradation reproducibility in a range from a low density portion to a high density portion can be formed by the converted density value.

16 Claims, 12 Drawing Sheets

IMAGE FORMING APPARATUS WHICH FORMS HALFTONE IMAGES MIXED WITH CHARACTERS AND FINE LINES

This application is a continuation of application Ser. No. 07/808,633 filed Dec. 17, 1991, now abandoned.

BACKGROUND OF THE INVENTION

1. Field of the Invention

The invention relates to an image forming apparatus of a copying apparatus, a printer, or the like and, more particularly, to an image forming apparatus for clearly reproducing characters and fine lines in the case of forming an image in which an image area of a half tone such as photograph, screen (or dot), or the like mixedly exists oils characters and fine lines.

2. Description of the Related Background Art

In recent years, the number of full-color images being generated has increased, not only in the field of print or design, but also in the field of offices or the like. Consequently, color copying apparatuses which read color original documents at a high fidelity and which generate full-color images have also become wide spread. In those color copying apparatuses, the requirement to generate a full-color image at a high gradation, and the requirement to generate a clear color character original at a high resolution are simultaneously needed.

A dither method, a screen dot modulating method, and the like are known as methods of generating a full-color image at a high gradation. However, when those methods are applied to characters or a line image, the resolution remarkably decreases and the character quality deteriorates. On the other hand, a binary process is suitable to preferably reproduce characters or a line image. However, as is well known, when the binary process is applied to a screen or photograph image, the gradation remarkably decreases and the picture quality deteriorates as well.

Many methods have been proposed to reconcile character quality half-tone quality. For instance, in an image reading apparatus, there have been proposed methods whereby a black area is first extracted by lightness information and saturation information of an original document, an edge portion of the original document is further extracted to thereby discriminate the black edge portion, a black character and a black fine line in a color image or a screen are automatically discriminated on the basis of a degree of black edge and a degree of color information near the black edge portion by referring to the color information near the black edge portion, and an image signal including a signal to designate image forming conditions is generated to an image forming apparatus (U.S. patent application Ser. No. 173,654 filed on Mar. 25, 1988, U.S. Pat. No. 4,958,219, U.S. patent application Ser. No. 327,098 filed on Mar. 22, 1989, U.S. Pat. No. 5,031,034, U.S. patent application Ser. No. 519,500 filed on May 4, 1990 U.S. Pat. No. 5.113.252, and U.S. patent application Ser. No. 267,366 filed on Nov. 4, 1988.

In the above image forming apparatus, images are respectively formed by first and second image forming circuits suitable for a half-tone image reproduction and a line image reproduction in accordance with the image forming conditions.

For instance, a laser beam printer having advantages such that a print quality is high, a print speed is high, and such a printer is wisely used as an output device of a color copying apparatus or the like.

FIGS. 2A and 2B are block constructional diagrams of an image forming apparatus such as a laser beam printer. The conventional image forming apparatus will now be described hereinbelow with reference to the drawings. In the conventional apparatus, a laser beam copying apparatus of the electrophotographic type which scans a laser beam onto a photo sensitive drum synchronously with the reading of an original document to thereby form an image will be explained. The above principle has been disclosed in, for instance, U.S. Pat. No. 4,800,442.

An original document 9 is first read by a CCD 1. A resultant analog image signal is amplified to a predetermined level by an amplifier 2 and is converted into a digital image signal of eight bits (gradations 0 to 255) by an A/D converter 3. The digital image signal is transmitted through a gradation control circuit 10 (converting circuit to perform a digital conversion by a measure of a look-up table constructed by an RAM of 256 bytes) and is gradation corrected and is supplied to a D/A converter 14.

The digital signal is again converted into the analog signal by the D/A converter 14. The analog signal is compared with a signal of a predetermined period which is generated from a triangle wave generation circuit 15 by a comparator 16 and is pulse width modulated. The pulse width modulated binary image signal is directly supplied to a laser drive circuit 17 (FIG. 2B) and is used as a signal to on/off control the light emission of a laser diode 18. A laser beam emitted from the laser diode 18 is scanned in the main scanning direction by a well-known polygon mirror 19 and is transmitted through an f/θ lens 20 and is reflected by a reflecting mirror 21. The laser beam is subsequently irradiated onto a photo sensitive drum 22 as an image carrier which is rotating in the direction shown by an arrow, thereby forming an electrostatic latent image thereon.

After the photo sensitive drum 22 is uniformly discharged by an exposing device 28, it is uniformly charged to a minus potential by a charging device 23. After that, the laser beam is irradiated onto the drum 22 and an electrostatic latent image corresponding to an image signal is formed on the surface of the drum 22. What is called an image scanning method of exposing a portion (black pixel) to be developed is then executed (this is frequently used in laser beam printers). Therefore, by a well-known inverse developing method, a developing device 24 deposits toner having minus charging characteristics to the portion of the drum 22 which has been discharged by the laser beam and develops the latent image.

The developed image (toner image having minus charges) formed on the drum 22 by the above method is copy transferred onto a copy transfer material (generally, paper) 26 by a copy transfer charging device 25.

The visible toner image, now transferred to the copy transfer material 26, is then fixed by a fixing device (not shown).

The residual toner remaining on the drum 22 is scraped off by a cleaner 27. The above processes are again repeated.

In the image forming apparatus as mentioned above, in order to clearly reproduce a line image such as, particularly, characters and fine lines or the like, the line image and a half-tone image are discriminated in the image reading apparatus (as described above), when the line image and half-tone image are formed, a period of the reference pulse which is used in the pulse width modulation process is changed. More particularly, a plurality of gradation reproducing characteristics as shown at a and b in FIG. 3 are selected and the reproducing characteristic a is selected for the half-tone image, thereby assuring the adequate gradation reproduction in a range from a low density portion to a high density portion, while the gradation reproducing characteristic b is selected for the line image, thereby executing the gradation reproduction of an edge emphasis, so that the characters and line image can be clearly reproduced.

When the line image and half-tone image are formed, by changing a light emission quantity of the laser diode 18, a plurality of gradation reproducing characteristics similar to those mentioned above are selected and the gradation reproduction suitable to form the half-tone image and the line image can be also executed.

In the above conventional example, however, by selecting the gradation reproducing characteristic as shown at b in FIG. 3 to a fine image, although characters and fine line of high densities are more clearly reproduced, there is a problem such that a micro fluctuation of the density is emphasized for characters or fine line having low densities and the sharpness is contrarily lost.

To solve the above problem, accordingly, there is used a method of selecting the gradation reproducing characteristic suitable to reproduce a line image by using the gradation control circuit 10.

FIG. 4 shows a gradation reproducing characteristic which is obtained after the gradation correction suitable for reproduction of a fine image was executed by using the gradation control circuit 10. As shown in FIG. 4, by performing a stepwise gradation reproduction, line images such as characters, fine lines, and the like of various densities in a range from a low density to a high density can be clearly reproduced at a uniform density.

However, in the case where the gradation reproduction as mentioned above is performed, there is a drawback such that when a fine image having a density near the density at which the gradation is switched is reproduced, the reproduction density of the fine image lies between two steps of the gradation reproducing characteristic and a stepwise density change considerably occurs in the fine image.

Consequently, when the copying operation is executed a plurality of times, such a density change becomes large so that it cannot be ignored.

Further, although there has hitherto been known a method of executing different processes to the line image and gradation image, the ability to realize uniform density of a line image when mixed with a gradation image has not yet been achieved. Further still, such an ability has not yet been achieved in the formation of a color image.

SUMMARY OF THE INVENTION

It is an object of the invention to eliminate the conventional drawbacks mentioned above and to provide an image forming apparatus in which when forming an image in which an image area of a half tone such as photograph, screen, or the like and characters and fine line mixedly exist, both of the half-tone image area and the character and fine line portion can be stably reproduced without deteriorating the picture quality, and particularly, the character and fine line portion is clearly reproduced.

To accomplish the above object, according to the present invention, an image processing apparatus comprises input means for inputting image data representing an image; discriminating means for discriminating image data representing a predetermined type of image; and processing means for processing the image data inputted by the input means in accordance with a frequency of each density level of the image data representing the predetermined type of image discriminated by the discriminating means.

Still another object of the invention is to accurately execute a density correction.

To accomplish the above object, according to the invention, an image processing apparatus comprises input means for inputting image data representing an image; discriminating means for discriminating image data representing a line image; arithmetic operating means for calculating a frequency of each density level of the image data representing the line image discriminated by the discriminating means; and correcting means for correcting the input image data in accordance with the frequency calculated by the arithmetic operating means.

Still another object of the invention is to form a histogram without having a memory of a large capacity and to execute an image process on the basis of the histogram.

To accomplish the above object, according to the invention, a copying apparatus comprises reading means for scanning an original and generating image data; discriminating means for discriminating image data representing a predetermined type of image; arithmetic operating means for calculating a frequency of each density level of the image data representing the predetermined type of image discriminated by the discriminating means; and processing means for processing the image data generated by the reading means, wherein the discriminating means and the arithmetic operating means are made operative in accordance with the first scanning by the reading means and the processing means is made operative in accordance with the second scanning by the reading means.

Further another object of the invention is to provide a copying apparatus which can form an image at a high speed.

Further another object of the invention is to execute the optimum density correction every color component.

Further another object of the invention is to form an image of a good color reproducibility.

The above and other objects and features of the present invention will become apparent from the following detailed description and the appended claims with reference to the accompanying drawings.

DETAILED DESCRIPTION OF THE PREFERRED EMBODIMENTS

An example of a color laser beam printer of the electrophotographic type will be described in detail hereinbelow as a preferred embodiment of the invention with reference to the drawings.

Figure 5:
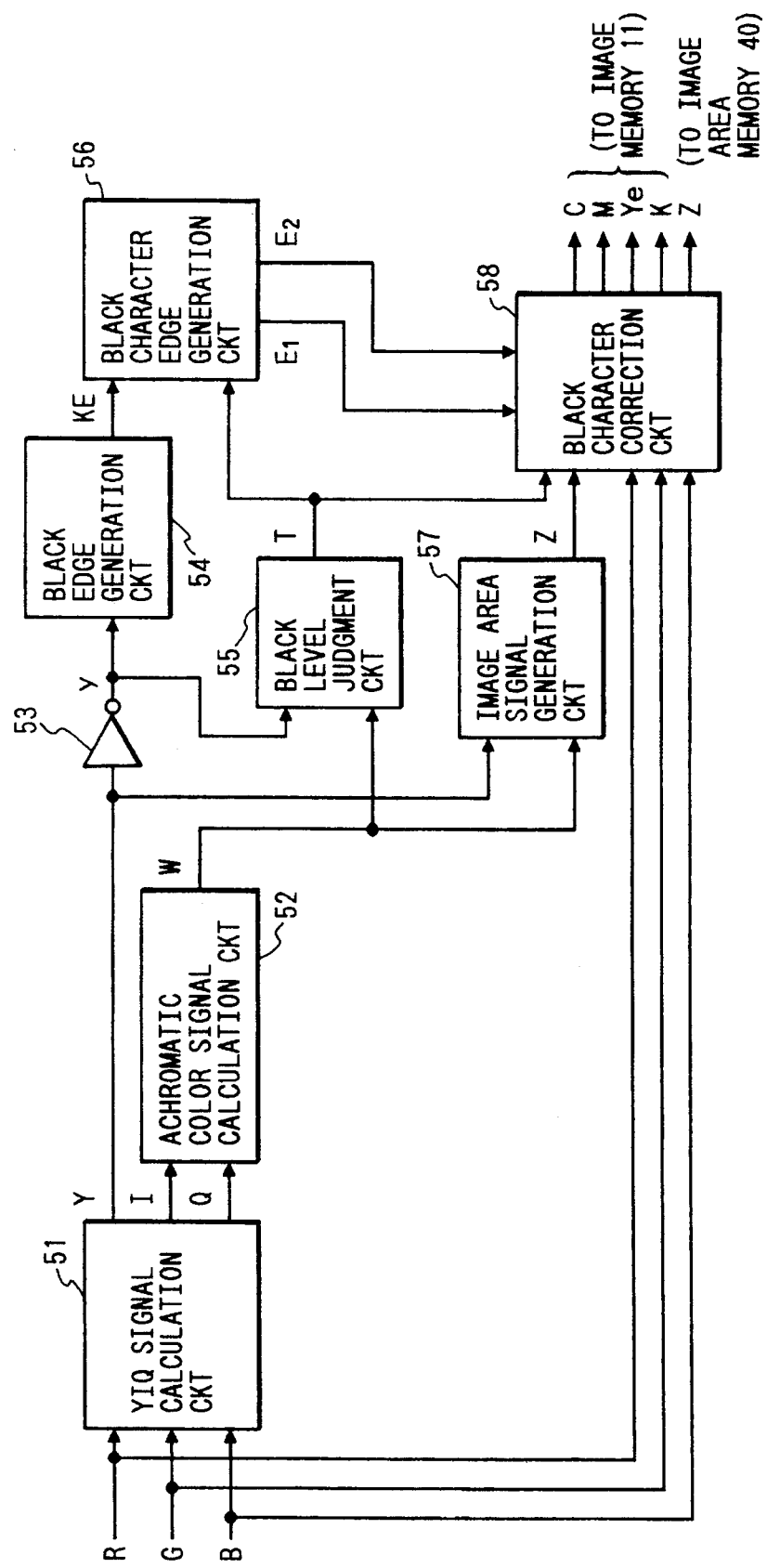
FIG. 5 is a block constructional diagram of a discriminating section of a line image and a half-tone image in an image forming apparatus according to the invention.

A method of discriminating a line image and a half-tone image in an image reading apparatus will be first described. In FIG. 5, signals of R (red), G (green), and B (blue) are color signals of one pixel which have been read by the color original reading apparatus. A YIQ signal calculation circuit 51 calculates a luminance signal Y and color signals I and Q from the RGB signals. The luminance signal Y is a basic signal of an edge signal of a black character and is inverted and converted into a darkness signal y by an inverter 53. After that, a black edge signal KE which has been edge extracted by a Laplacian transformation by a black edge generation circuit 54 is generated.

The color signals I and Q are signals indicative of color differences from an achromatic color and are supplied to an achromatic color signal calculation circuit 52, from which an achromatic color signal W is generated by using a look-up table. The achromatic color signal W indicates the achromatic color with an increase in value. The achromatic color signal W and the darkness signal y are supplied to a black level judgment circuit 55, from which a dark achromatic color, that is, a black level is generated as a black level signal T of two or more values.

A black character edge generation circuit 56 respectively generate black character edge signals $E_1$ and $E_2$ from the black edge signal KE in accordance with the black level signal T. The black character edge signal $E_1$ is a signal to emphasize the edge of a black character. The black character edge signal $E_2$ is a signal to eliminate a black deviation of the edge of a black character.

An image area signal generation circuit 57 determines such that a region of a bright chromatic color and its peripheral portion are set into a gradation image area and the other regions are set into a line image area on the basis of the achromatic color signal W and the luminance signal Y. The generation circuit 57 subsequently generates an image area judgment signal Z.

In a black character correction circuit 58, signals of C (cyan), Y (magenta), Ye (yellow), and K (black) are obtained from the above RGB signals, and in the black character edge signals $E_1$ and $E_2$ in which an erroneous judgment has been eliminated by the image area judgment signal Z, the signal $E_2$ is added as a correction signal to the C, M, and $Y_e$ signals and the signal $E_1$ is added as a correction signal to the K signal. The black character correction circuit 58 generates the C, M, Ye, and K signals into an image memory 11 of an output device such as a printer or the like and generates the image area signal Z into an image area memory 40.

<Embodiment 1>

An image forming apparatus (laser printer) in the first embodiment in which an image is formed by an image signal generated by the image reading apparatus mentioned above will now be described.

Figure 1A:
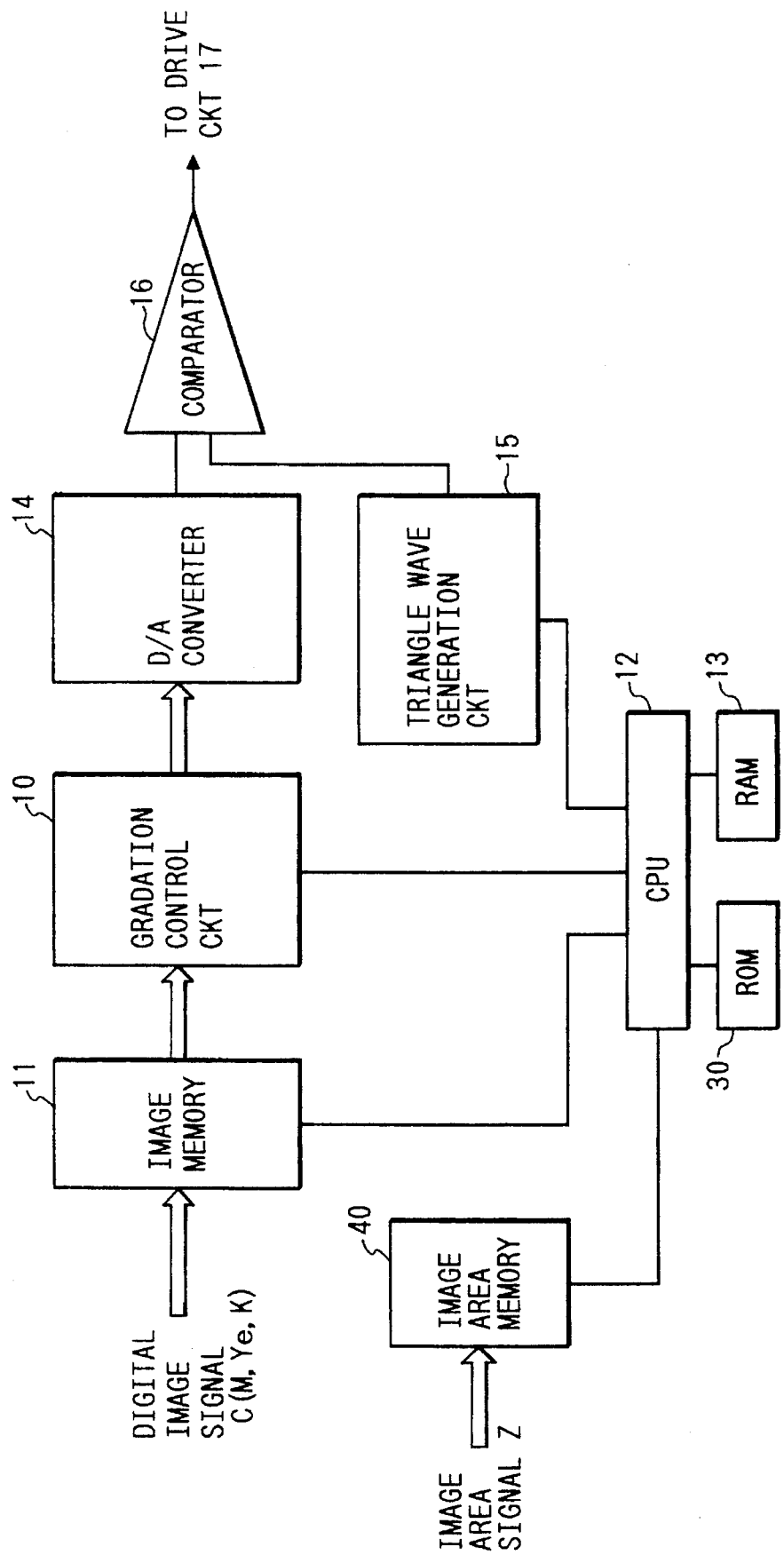
FIGS. 1A and 1B are block constructional diagrams of an image forming apparatus according to the invention.
Figure 1B:
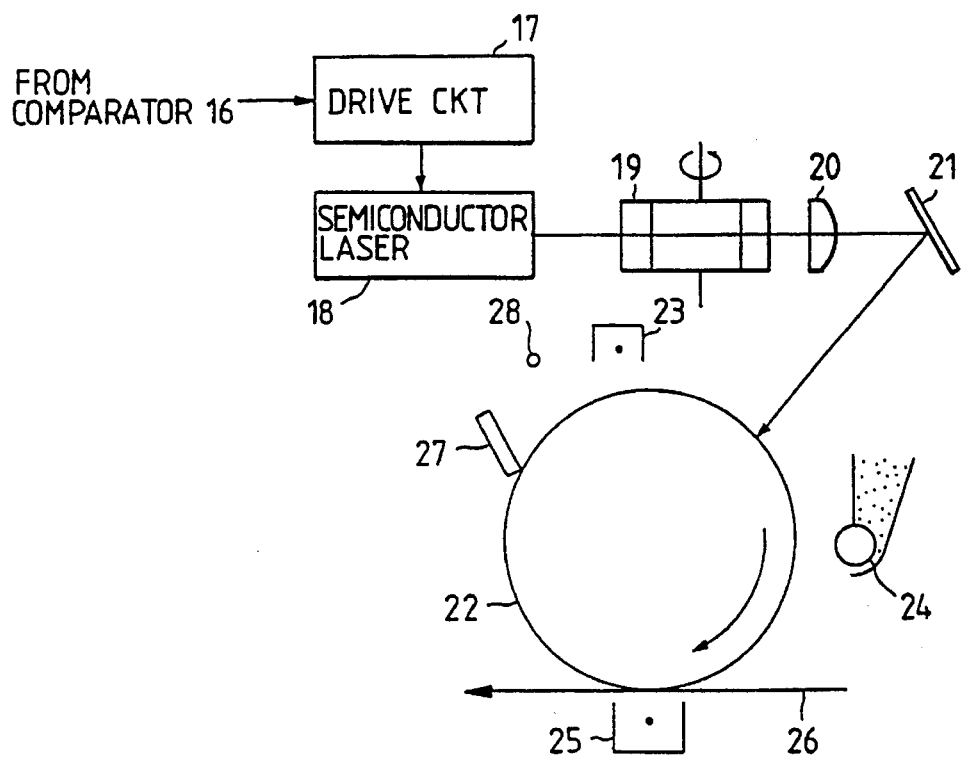

FIGS. 1A and 1B are block diagrams showing a construction of an image forming apparatus in the embodiment. Although the image forming means for C (cyan) will be explained here, the same shall also apply to the other image forming means for M, Ye, and K. A CPU 12, an RAM 13, an ROM 30, and the image area memory 40 are commonly used for four colors of C, M, Ye, and K.

The component elements similar to those in the conventional apparatus mentioned above are designated by the same reference numerals and their descriptions are omitted here.

In the diagram, reference numeral 11 denotes the image memory to store the digital image signal after the line image and the half-tone image were discriminated in the image reading apparatus. The image memory 11 is switched to either one of two modes; a first mode to transfer the stored digital image data to the CPU 12, and a second mode to transfer it to the gradation control circuit 10 under the control of the CPU 12. Reference numeral 13 denotes the RAM serving as a work area which is used when the CPU 12 operates. Reference numeral 30 denotes an ROM in which a program of the CPU 12 and control data are stored.

Image forming steps in the first embodiment will now be described in accordance with the order of the processing steps.

The digital image signal generated from the above image reading apparatus is first stored into the image memory 11 on a pixel unit basis. The CPU 12 subsequently reads the signal of the line image portion in the stored digital image signal and forms a frequency distribution function (density histogram) showing a detection frequency of corresponding density values every pixel. A discrimination about the line image is performed on the basis of the content of the image area memory 40. The density histogram formed here is stored into the RAM 13.

In the embodiment, the foregoing density histogram is formed with respect to the digital image signal of the line image area discriminated by the image reading apparatus as mentioned above.

Figure 6:
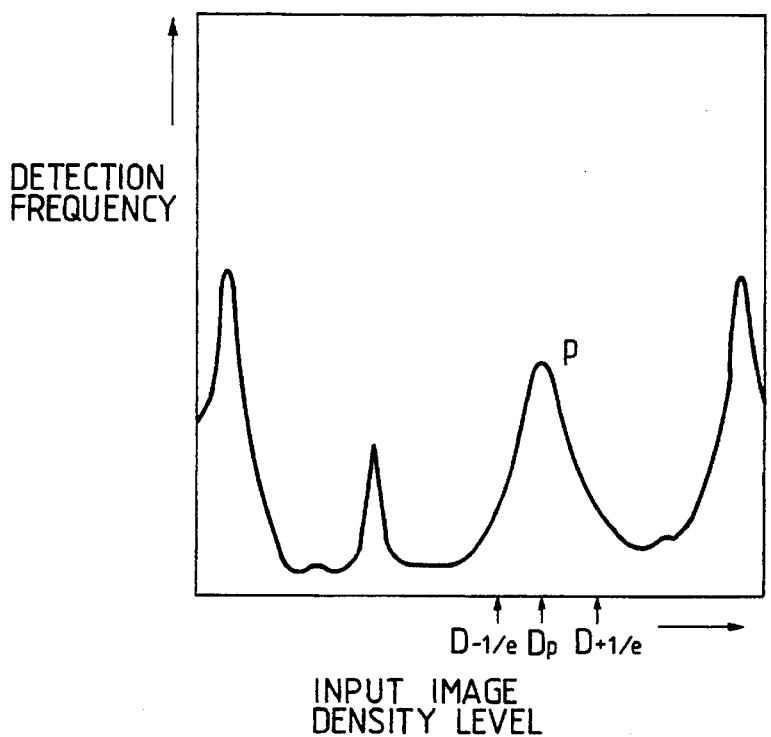
FIG. 6 is a diagram showing a frequency distribution function indicating a detection frequency of density values in a line image area.

The density histogram of the line image area formed as mentioned above is as shown in, e.g., FIG. 6.

As shown in FIG. 6, when the density histogram is obtained with respect to the line image area in one image, a maximum value P of the frequency distribution, namely, a density level value $D_p$ of the portion in which a detection frequency is locally high is detected from the result of the histogram. The above detecting operation is executed by the CPU 12 by examining the histogram stored in the RAM 13. Various methods can be realized as a method of converting the density values near the density level value $D_p$ at which the detected frequency distribution becomes maximum into at least one density value. In the embodiment, an easier method is used and it will be explained hereinbelow.

That is, the density level value is respectively scanned one step by one to the high density side and the low density side by using the density level value $D_p$ at which the frequency distribution becomes maximum as a center. The detection frequency corresponding to each density level value $D_x$ is checked from the histogram stored in the RAM 13. The detection frequency $N(D_p)$ at the density level value $D_p$ mentioned above is compared with the detection frequency $N(D_x)$ at each density level value $D_x$. The scanning operation is stopped at a time point when a ratio of $N(D_x)$ to $N(D_p)$ is equal to a predetermined ratio (for instance, $N(D_x)=1/2N(D_p)$, $N(D_x)=1/eN(D_p)$, $N(D_x)=1/e2N(D_p)$, etc.). The density level values at that time on the high density side and low density side assume $D+1/e$ and $D-1/e$, respectively.

In the first embodiment, the density side value corresponding to $N(D_x)=1/eN(D_p)$ is used.

In the first embodiment, the density level

The density level values $D_e$ which satisfy the relation $(D-1/e \leq D_e \leq D+1/e)$ are converted into at least one density value, namely, $D_p$ in the embodiment. The above conversion is performed when the image information in the image memory 11 is sequentially read out every pixel when an image is formed. The image density signal of each pixel which has been read out of the image memory 11 is sent to the gradation control circuit 10. The signal in which the density level value is equal to $D_e$ is converted into the density level value $D_p$.

Figure 7:
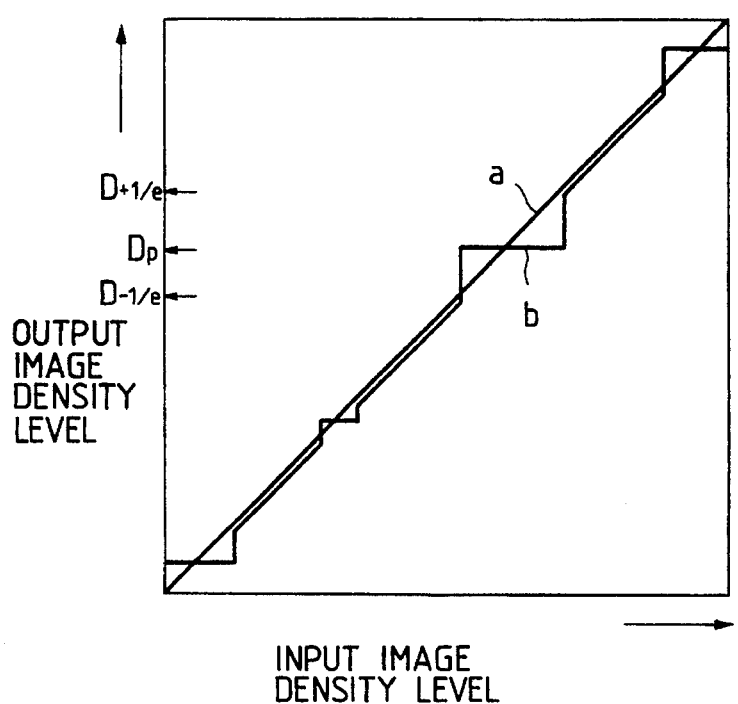
FIG. 7 is a diagram showing gradation reproducing characteristics in an image forming apparatus according to the invention.

As mentioned above, the digital image signal in which the conversion of the density level value, namely, the gradation correction has been executed is subsequently subjected to image formation. In FIG. 7, b denotes a graph showing a gradation reproducing characteristic after the line image having total two maximum values of the density histograms in the low density portion and high density portion was converted.

The digital image signal corresponding to the half-tone image area discriminated by the image reading apparatus as mentioned above is corrected to a gradation reproducing characteristic as shown at a in FIG. 7 by the gradation control circuit 10, so that the sufficient gradation reproducing characteristic is assured in a range from the low density portion to the high density portion and, after that, the digital image signal is used to form an image.

The subsequent image forming processes are similar to those mentioned in the conventional apparatus.

Figure 10:
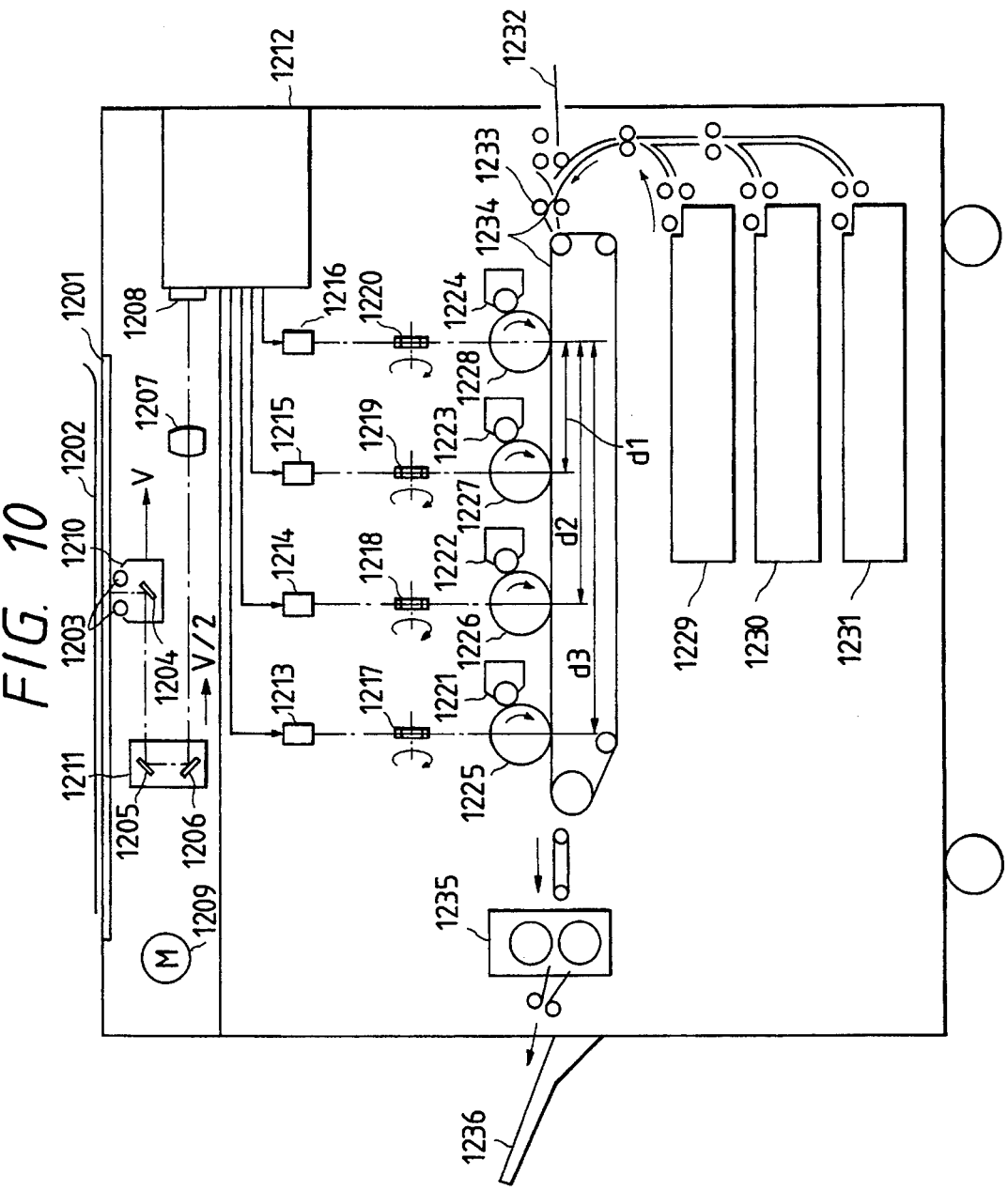
FIG. 10 is a diagram showing a copying apparatus using the invention.

In the embodiment, as mentioned above, since the independent image forming units are provided for the respective four colors of C, M, Ye, and K, the image forming processes can be executed in parallel. FIG. 10 shows a whole construction of a copying apparatus having such an image forming apparatus.

Reference numeral 1201 denotes an original base glass on which an original 1202 to be read is put. The original 1202 is irradiated by a halogen lamp 1203. A reflected light from the original 1202 is reflected by mirrors 1204 to 1206 and an image if formed onto a CCD sensor 1208 by an optical system 1207. Further, a mirror unit 1210 including the mirror 1204 and the halogen lamp 1203 is mechanically driven at a velocity v by a motor 1209, while a second mirror unit 1211 including the mirrors 1205 and 1206 is mechanically driven at a velocity v/2. Thus, the whole surface of the original 1202 is scanned.

Reference numeral 1212 denotes an image processing unit for processing the image read by the CCD sensor 1208 as electric signals of R, G, and B and generating as print signals (M, C, Ye, K). The image processing unit 1212 is constructed as shown in FIG. 5.

Reference numerals 1213 to 1216 (18 in FIG. 1B) denote semiconductor lasers which are driven by the print signals (M, C, Ye, K) generated from the image processing unit 1212. Laser beam emitted from the semiconductor lasers are reflected by polygon mirrors 1217 to 1220 (19 in FIG. 1B) and form latent images onto photo sensitive drums 1225 to 1228 (22 in FIG. 1B). Reference numerals 1221 to 1224 (24 in FIG. 1B) denote developing devices to develop the latent images by the toners of K, Ye, C, and M, respectively. The developed toners of the four colors are copy transferred onto the sheet 26 and a full-color image is printed and generated.

Each sheet fed from either one of sheet cassettes 1229 to 1231 and a hand inserting tray 1232 is conveyed through a resist roller 1233 and is adsorbed onto a transfer belt 1234 and is carried. Synchronously with the paper feed timing, the toners of the respective colors have previously developed on the photo sensitive drums 1228 to 1225. The toners are copy transferred onto the sheet together with the conveyance of the sheet.

The sheet on which the toners of the respective colors have been transferred is separated from the transfer belt 1234 and is conveyed. The toners on the sheet are fixed by a fixing device 1235 and, after that, the sheet is discharged onto a paper discharge tray 1236.

Figure 12:
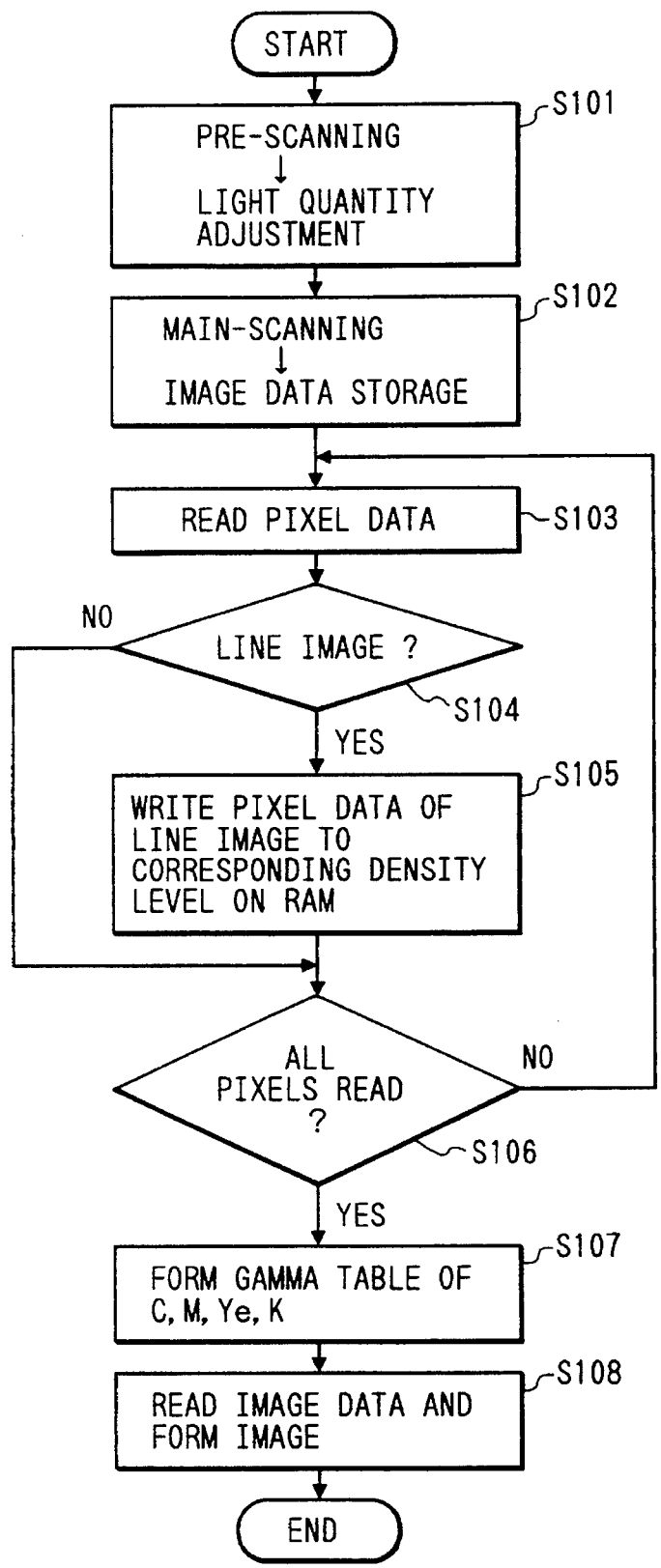
FIG. 12 is a diagram showing a processing procedure of the invention.

A processing procedure to form gamma tables in the copying apparatus with the above construction will now be described with reference to FIG. 12.

A pre-scanning of an original is executed by the image reader section in FIG. 10 in step S101. Image reading conditions such as a light quantity of the halogen lamp 1203 and the like are adjusted.

In step S102, the main-scanning of the original is performed under the conditions adjusted in step S101. The image data of C, M, Ye, and K processed by the circuit of FIG. 5 are stored into the image memory 11 and the image area signal Z is stored into the image area memory 40.

In step S103, the CPU 12 reads out the image data every pixel. The processing steps S103 to S106 are executed sequentially or in parallel with respect to each of C, M, Ye, and K.

In step S104, a check is made to see if the read data is a line image or not by referring to the content in the image area memory 40. When it is not a line image, step S106 follows.

In step S105, the pixel data of the line image is written to the corresponding density level in the RAM 13.

In step S107, the gamma tables of C, M, Ye, and K are formed on the basis of the histogram of the line image formed as mentioned above.

Figure 11:
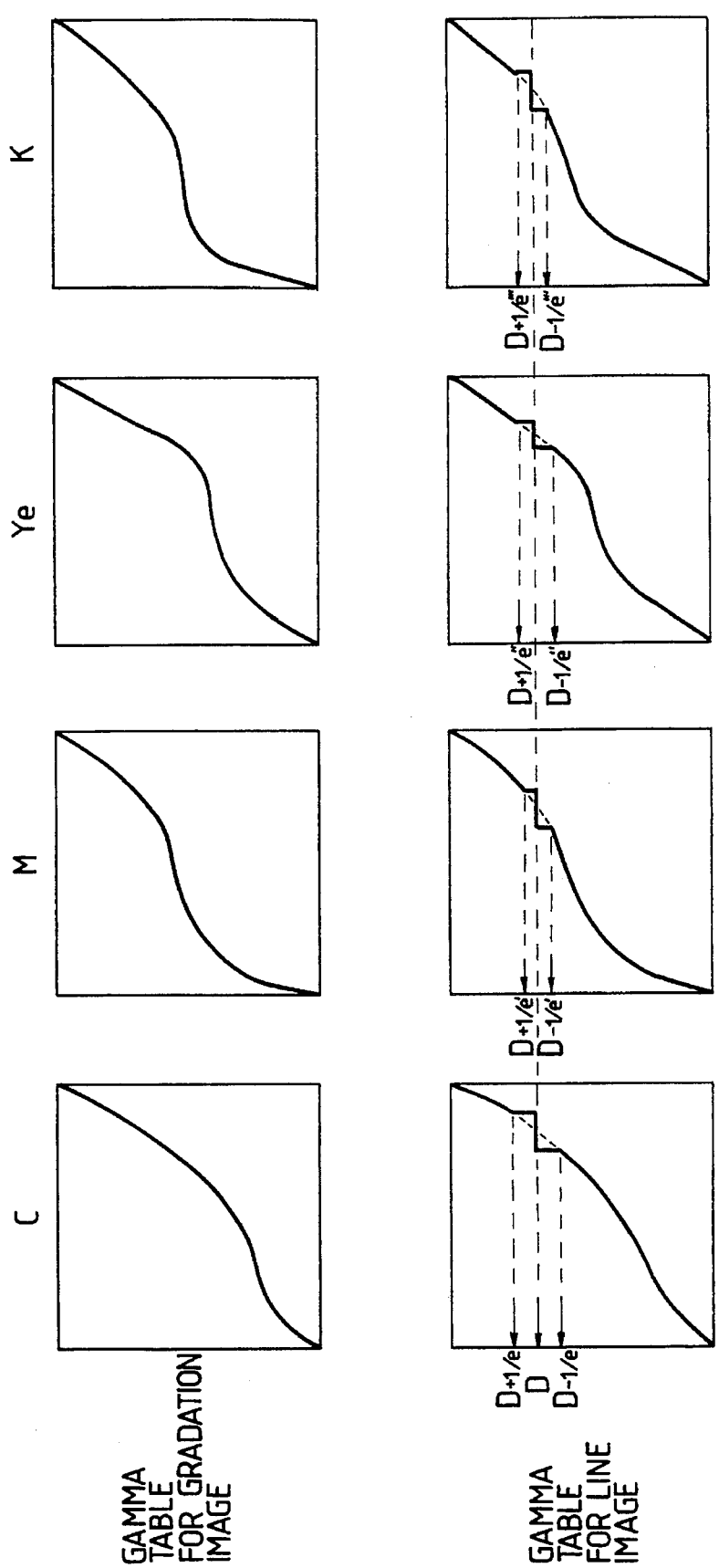
FIG. 11 is a diagram showing examples of gamma tables which are used in the invention.

FIG. 11 show the gamma tables which are formed here.

Gamma tables for the line image are formed for the gamma tables for the gradation image by the method as mentioned above. Sizes of 1/e, 1/e', 1/e'', and 1/e''' may be also set to different values.

The gamma tables for the gradation image and the gamma tables for the line image formed here are switched and used on the basis of the content of the image area memory 40. That is, the gamma tables for the gradation image and the gamma tables for the line image are provided in the gradation control circuit 10 and the gamma correction is selectively executed to the image data.

In step S108, the image data read out of the image memory 11 is processed on the basis of the gamma tables formed in step S107 and an image is formed. <Embodiment

2>

In the first embodiment mentioned above, after the digital image signal was stored into the image memory 11, the density histogram is formed and the gradation correction is performed. In the second embodiment, the formation of a density histogram and the gradation correction are executed without using the image memory 111.

Figure 2B:
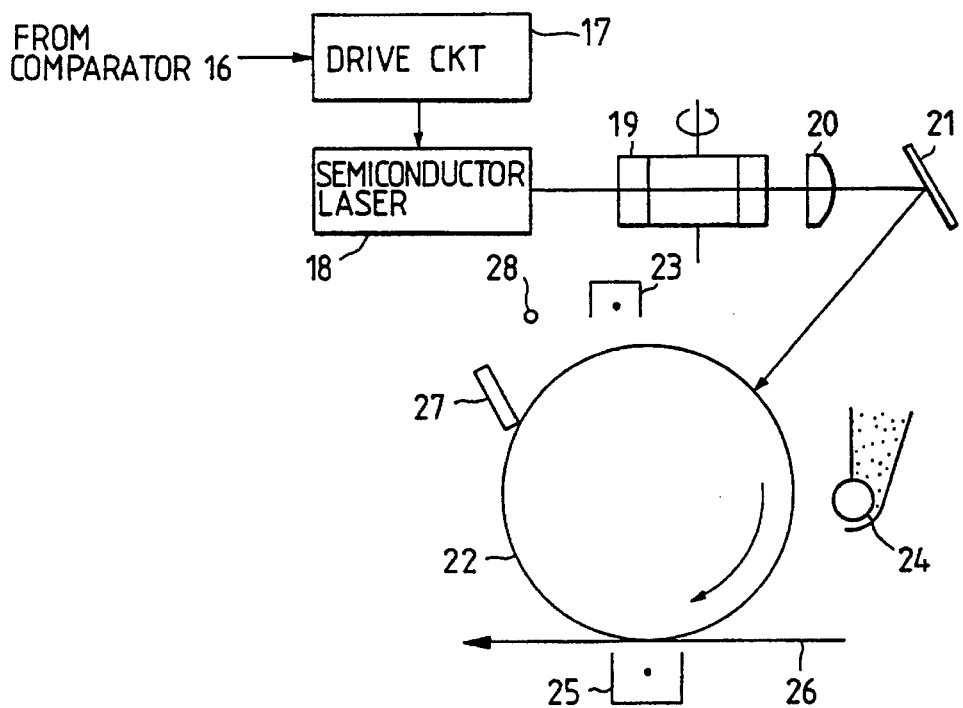
FIGS. 2A and 2B are block constructional diagrams of a conventional image forming apparatus.
Figure 2A:
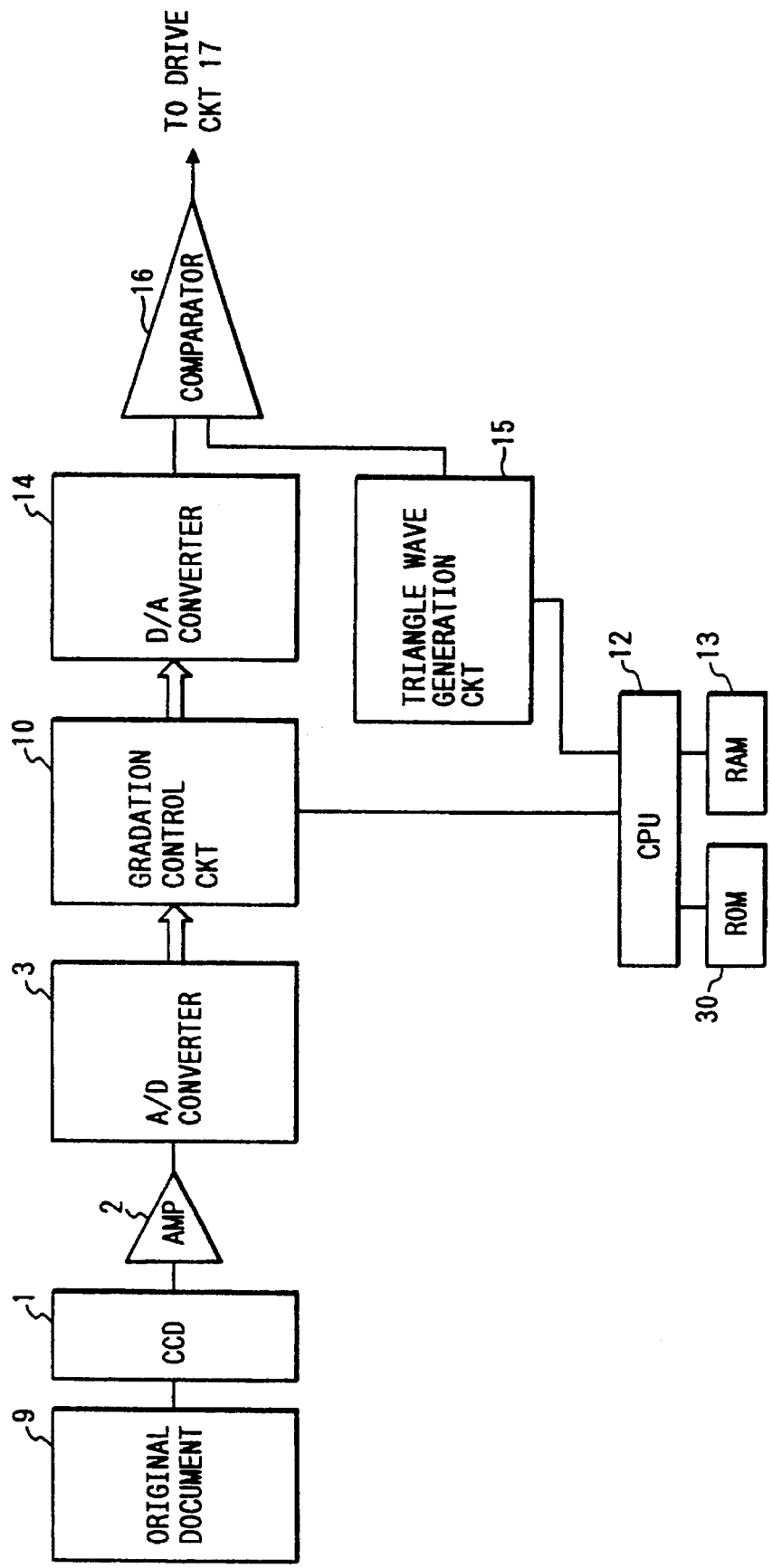
Figure 3:
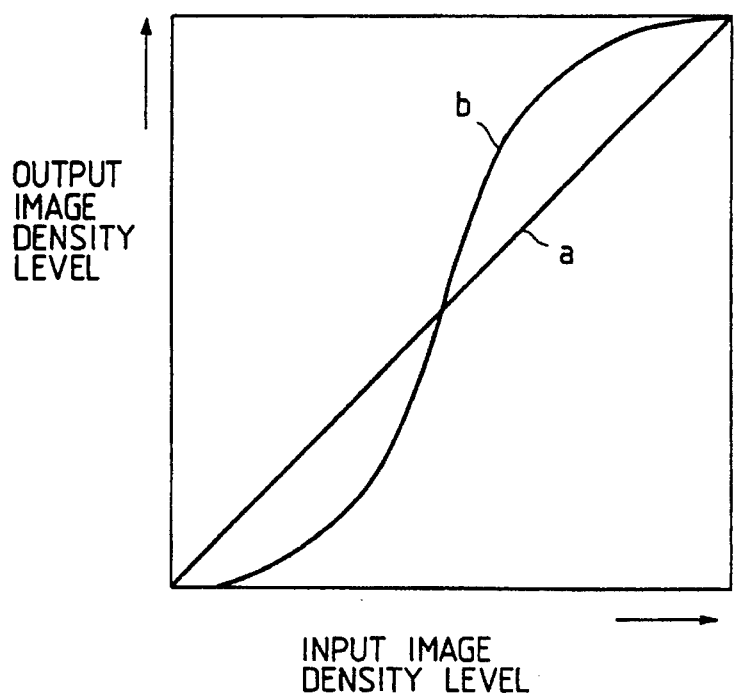
FIG. 3 is a diagram showing gradation reproducing characteristics in the conventional image forming apparatus.
Figure 4:
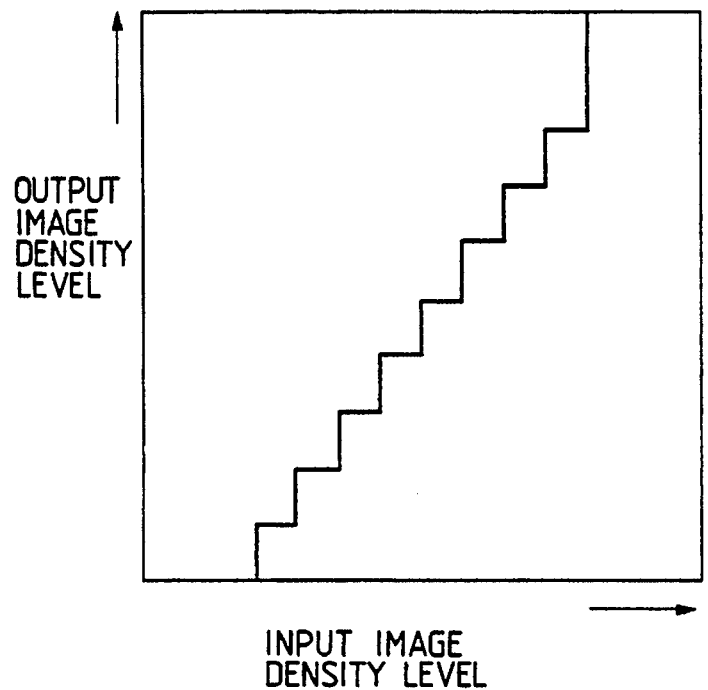
FIG. 4 is a diagram showing another gradation reproducing characteristic in the conventional image forming apparatus.

Block constructional diagrams of an image forming apparatus in the second embodiment are similar to those shown in FIGS. 2A and 2B. The image forming processes in the second embodiment will now be described with reference to FIGS. 2A and 2B and 13.

When the image formation is first executed, the image signal corresponding to the image to be formed is read by the image reading apparatus in step S103 in the pre-scanning. In step S104, after the line image and the half-tone image were discriminated, a density histogram is formed with respect to the digital image signal corresponding to the line image area and stored into the RAM 13 in step S105. A conversion table is formed in step S107 from the density histogram formed so that the density levels near the density level $D_p$ at which the detection frequency becomes maximum are set to a predetermined value.

Subsequently, in step S201, the main-scanning is performed and the image signal corresponding to the image to be formed is again read by the image reading apparatus and is sent to the gradation control circuit 10 and the gradation correction is executed to the line image area in accordance with the above conversion table. The gradation correction similar to that in the first embodiment is executed to the half-tone area. After that, image forming processes similar to those in the first embodiment are executed in accordance with the digital image signal in which the gradation correction has been executed. <Embodiment 3>

Figure 8:
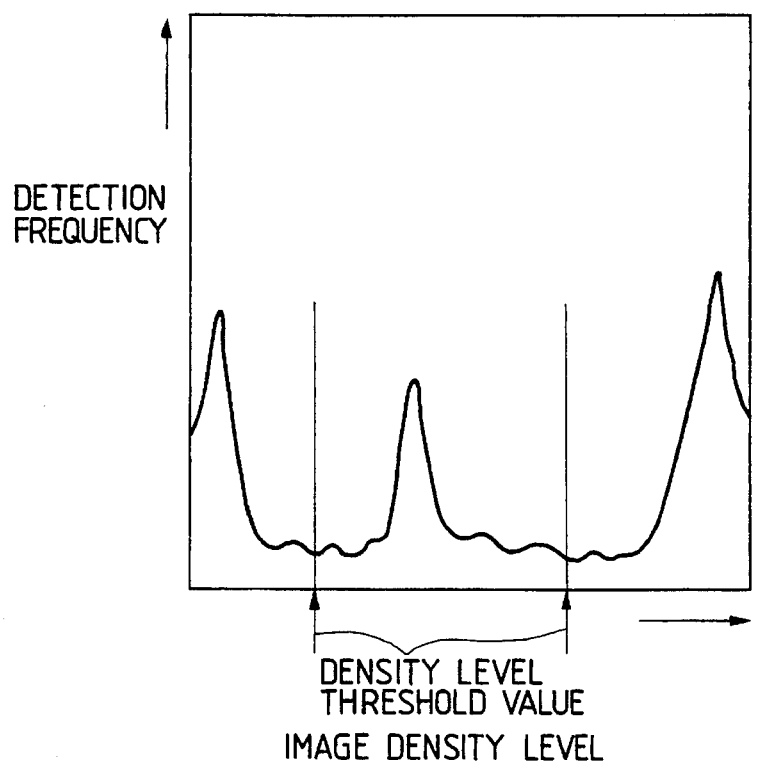
FIG. 8 is a diagram showing a frequency distribution function indicating a detection frequency of density values in a line image area.
Figure 9:
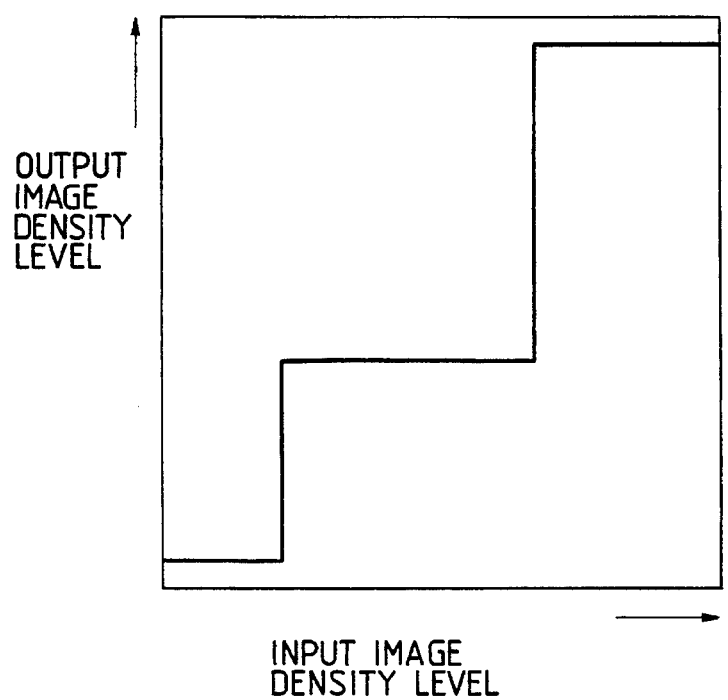
FIG. 9 is a diagram showing another gradation reproducing characteristic to a line image area in the image forming apparatus according to the invention.

As another method whereby the density values near the density level value $D_p$ at which the frequency distribution detected from the density histogram becomes maximum are converted into at least one density value, as shown in FIG. 8, it is also possible to use a method whereby threshold density levels are set among a plurality of density levels at which the detection frequency becomes maximum and the density level value in each of the density level areas divided by the threshold density levels is converted into the density level value at which, for instance, the detection frequency becomes maximum in each of the density level areas as shown in FIG. 9. <Embodiment 4>

In the above first to third embodiments, the example of the color laser beam printer of the electrophotographic type in which the image forming unit having a photo sensitive material and the like is provided for each of C, M, Ye, and K has been described. However, the invention can be also applied to a color laser beam printer of the type in which one photo sensitive material is sequentially used with respect to C, M, Ye, and K and an image is frame-sequentially formed.

Figure 14:
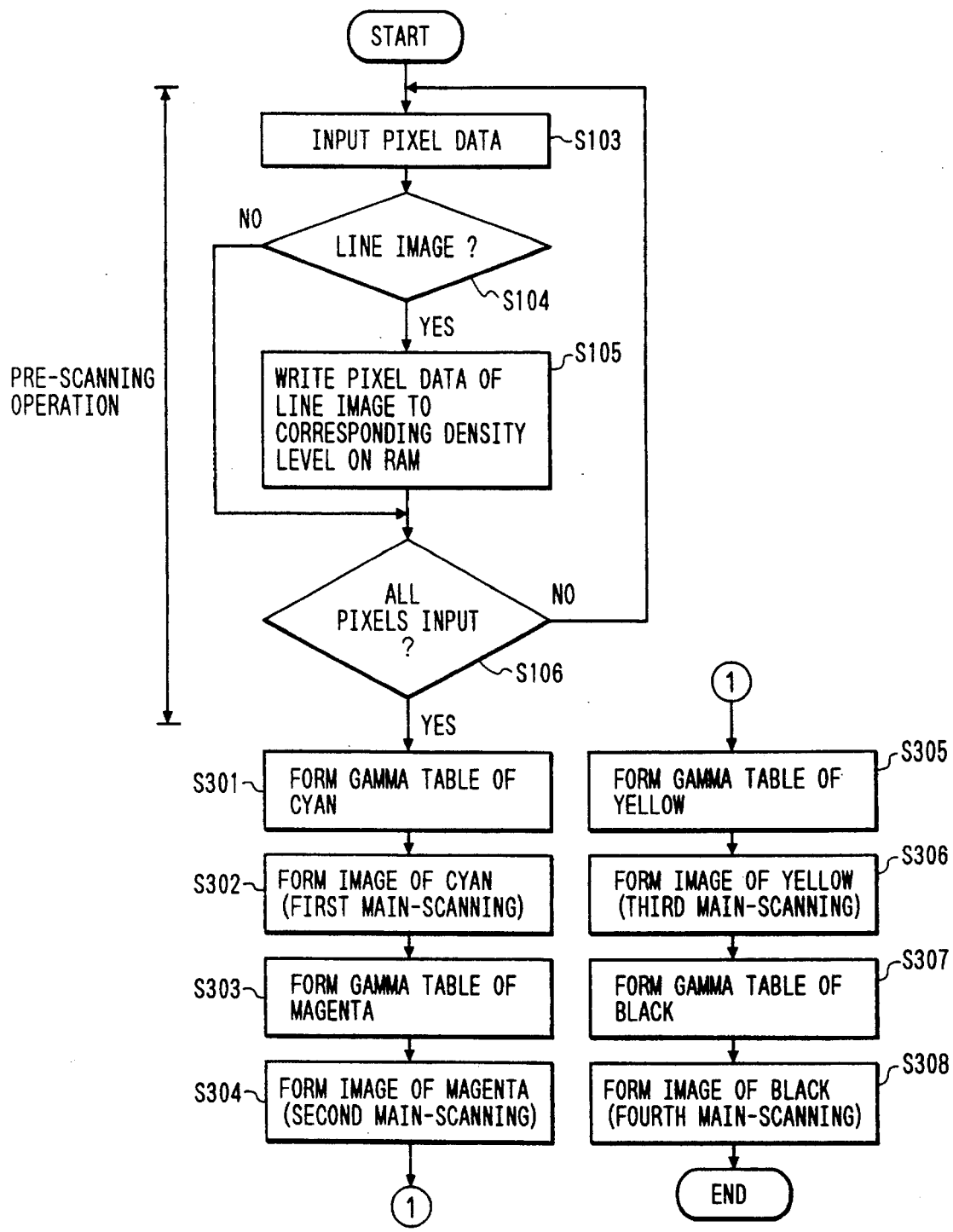
FIG. 14 is a diagram showing another modification of the invention.

FIG. 14 shows a processing procedure in such a case.

Figure 13:
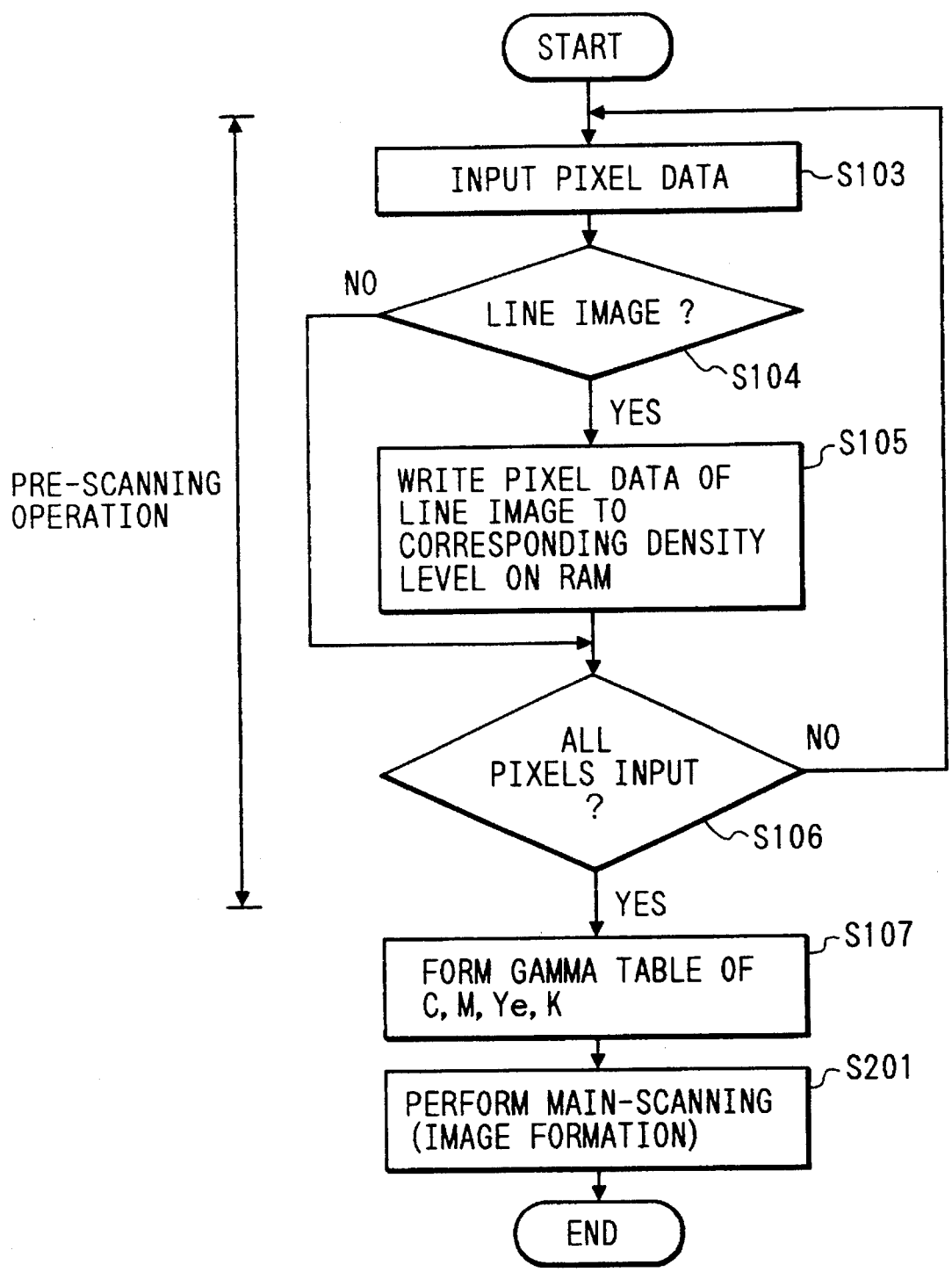
FIG. 13 is a diagram showing a modification of the invention.

Processing steps S103 to S106 are similar to those in FIG. 13.

In step S301, a gamma table of cyan is formed. The first main-scanning is executed in step S302 and a cyan image is formed.

Similarly, the formation of a gamma table and the image formation are also executed with respect to each of magenta in steps S303 and S304, yellow in steps S305 and S306, and black in steps S307 and S308.

A full-color image can be formed as mentioned above by using one photo sensitive material without using a plurality of photo sensitive materials.

The invention is not limited to the foregoing embodiments. Similar effects are, further, also obtained with respect to other general image forming apparatuses such as copying apparatus, recording apparatus which constructs an output section of a facsimile, a computer, or the like, and image forming apparatuses using various image forming methods such as heat transfer method, ink jet method, silver salt photographing method, and the like. Particularly, the ink jet printer includes a bubble jet printer of the type in which a liquid droplet is emitted by using a film boiling by a heat energy.

According to the embodiments of the invention as described above, particularly, when an image in which a half-tone image area such as photograph, screen, or the like and characters and fine lines mixedly exist is formed, the half-tone image area and the portion of characters and fine lines are stably reproduced without deteriorating the picture qualities of both of them. Particularly, the characters and fine line portion can be clearly reproduced.

In the embodiments, although the image area signal Z has been produced by judging the edge of the achromatic color, in the case of applying the invention with respect to a color line image, it is sufficient to judge the edge.

On the other hand, it is also possible to form a histogram with respect to a line image, to also form histograms with regard to the portions other than the line image, and to form gamma tables for a gradation image.

The histogram is not formed in the RAM but can be also constructed by a hardware using a counter.

The present invention is not limited to the foregoing embodiments but many modifications and variations are possible within the spirit and scope of the appended claims of the invention.

What is claimed is:

1. An image processing apparatus for processing an image defined by plural pixels, comprising:

input means for inputting image data for each of said plural pixels of the image;

discriminating means for discriminating whether each of said plural pixels of the image data represents a pixel from a predetermined type of image;

forming means for forming a frequency distribution of density levels of image data for those pixels representing the predetermined type of image; and processing means for processing said image data inputted by said input means in accordance with the frequency distribution formed by said forming means.

2. An apparatus according to claim 1, wherein said predetermined image type is a line image.

3. An apparatus according to claim 1, wherein said processing means includes density correction means for executing a density correction in accordance with said frequency.

4. An apparatus according to claim 1, further comprising image forming means for forming an image onto a medium based on the image data processed by said processing means.

5. An apparatus according to claim 4, wherein said image forming means is a laser beam printer.

6. An apparatus according to claim 4, wherein said image forming means is a bubble jet printer.

7. An image processing method for processing an image defined by plural pixels, comprising the steps of:

inputting image data for each of said plural pixels of the image;

discriminating whether each of said plural pixels of the image data represents a pixel from a predetermined type of image;

forming a frequency distribution of density levels of the image data for those pixels representing the predetermined type of image; and processing said image data inputted in said input step in accordance with a frequency distribution formed in said forming step.

8. An image processing apparatus for processing an image defined by plural pixels, comprising:

input means for inputting image data for each of said plural pixels of the image;

discriminating means for discriminating whether each of said plural pixels of the image data represents a pixel from a line image;

arithmetic operating means for calculating a frequency distribution of density levels of image data for those pixels representing the line image; and correcting means for correcting said input image data in accordance with the frequency distribution calculated by said arithmetic operating means.

9. An apparatus according to claim 8, further comprising image forming means for forming an image onto a medium based on the image data connected by said correcting means.

10. An apparatus according to claim 9, wherein said image forming means is a laser beam printer.

11. An apparatus according to claim 9, wherein said image forming means is a bubble jet printer.

12. An image processing method for processing an image defined by plural pixels, comprising the steps of:

inputting image data for each of said plural pixels of the image;

discriminating whether each of said plural pixels of the image data represents a pixel from a line image;

calculating a frequency distribution of density levels of image data for those pixels representing the line image; and correcting said input image data in accordance with the frequency distribution calculated in said calculating step.

13. A copying apparatus comprising:

reading means for performing first and second scannings of each of plural pixels defined by an original, and for generating image data for each of said plural pixels;

discriminating means for discriminating whether each of said plural pixels of the image data represents a pixel from a predetermined type of image;

arithmetic operating means for calculating a frequency distribution of density levels of image data for those pixels representing the predetermined type of image; and processing means for processing the image data generated by said reading means in accordance with the frequency distribution calculated by said arithmetic operating means, wherein said discriminating means and said arithmetic operating means operatively correspond to the first scanning by said reading means, and said processing means operatively corresponds to the second scanning by said reading means.

14. An apparatus according to claim 13, further comprising image forming means for forming an image onto a medium based on the image data processed by said processing means.

15. An apparatus according to claim 14, wherein said image forming means is a laser beam printer.

16. An apparatus according to claim 14, wherein said image forming means is a bubble jet printer.

* * * * *

UNITED STATES PATENT AND TRADEMARK OFFICE
CERTIFICATE OF CORRECTION

PATENT NO.  : 5,467,196

DATED       : November 14, 1995

INVENTOR(S) : Satoru Fukushima, et al.

It is certified that error appears in the above-identified patent and that said Letters Patent is hereby corrected as shown below:

ABSTRACT:

Line 2, "or the like" should be deleted; and
Line 3, "exist" should read --mixedly exist,--.

COLUMN 1:

Line 15, "oils" should read --with--.

COLUMN 5:

Line 63, "Y (magenta)" should read --M (magenta)--.

UNITED STATES PATENT AND TRADEMARK OFFICE
CERTIFICATE OF CORRECTION

PATENT NO.  : 5,467,196
DATED       : November 14, 1995
INVENTOR(S) : Satoru Fukushima, et al It is certified that error appears in the above-indentified patent and that said Letters Patent is hereby corrected as shown below:

Column 7, line 57, "if" should read --is--.

Column 8, line 6, "beam" should read --beams--.

Signed and Sealed this

Thirtieth Day of April, 1996

Attest:

BRUCE LEHMAN

*Attesting Officer*   Commissioner of Patents and Trademarks